3,519,382
HIGH ENERGY RADIATION STABILIZATION OF CELLULOSE OBTAINED BY ESTERIFYING WITH BENZOYL CHLORIDE

Jett C. Arthur, Jr., Metairie, Florine A. Blouin, New Orleans, Trinidad Mares, Metairie, and David J. Stanonis, New Orleans, La., Glyn O. Phillips, Cardiff, Wales, and Ila M. Sarkar, Lake City, Fla., assignors to the United States of America as represented by the Secretary of Agriculture No Drawing. Continuation-in-part of application Ser. No. 385,808, July 28, 1964. This application Feb. 6, 1968, Ser. No. 703,278

Int. Cl. C08b *3/10, 3/22;* D06m *13/20*
U.S. Cl. 8—120                                    1 Claim

ABSTRACT OF THE DISCLOSURE

This invention relates to a method for stabilizing organic materials that contain the glycosidic bond to the effects of high energy radiation. Stabilization is achieved by the introduction of aromatic groups as substituents into the said organic material. The method of this invention has as its objective the modification of the chemical structure of organic materials which contain the glycosidic bond to allow preferential transfer of high energy from one part of the organic material to the aromatic substituent group within which group radiation energy is dissipated without damage to the glycosidic bond of the organic material.

---

A non-exclusive, irrevocable, royalty-free license in the invention herein described, throughout the world for all purposes of the United States Government, with the power to grant sublicenses for such purposes, is hereby granted to the Government of the United States of America.

This is a continuation-in-part of application Ser. No. 385,808, filed July 28, 1964, now abandoned.

The recent development of high and nuclear energy sources has caused considerable effort to be expended toward stabilizing numerous chemical compounds against high energy radiation. One of the classes of compounds most unsable to high energy radiation is the glycoside bond containing class. When aqueous solutions of glycosides in the solid state are exposed to high energy radiation, hydrolytic cleavage of the glycosidic bond is the predominant reaction. Apparently no localized absorption of the high energy radiation occurs in the aglycon portion of the molecule, as is the case when these materials are exposed to low energy radiation. In the case of photolysis, that is, exposure to low energy radiation, the introduction of a phenyl group into the glycosidic molecule tends to impart ability by reason of the direct absorption of radiation by the phenyl group. The introduction of aromatic groups into the glycosidic molecule, however, does greatly stabilize the glycoside against the effects of high energy radiation.

The instant invention defines a distinct improvement in the high energy radiation stabilization of glycosides in that (1) the introduction of aromatic groups into the glycosidic molecule localizes the radiation energy and stabilizes the compound to the effects of radiation (i.e., degradation of the compound); (2) the loss of aromatic groups due to the effects of radiation is greatly decreased particularly in the case of substituent benzoyl, benzhydryl, trityl, and cinnamoyl groups as compared with substituent phenyl groups thereby extending the radioprotection of the glycoside to very high dosages; (3) the stabilization achieved by the named groups is not a bond strength effect but is apparently due to a rapid localization of absorbed energy in the substituent aromatic ring thereby allowing the irradiated glycoside to revert to the ground state without undergoing chemical change.

We have found that acid formation accompanies the production of glucose during high energy radiation of solid methyl $\alpha$-D-glucopyranoside. From the linear yield-dose curves of these products, we found initial G(glucose) 2.33 and G(acid) 1.45. From infrared studies, using potassium bromide discs, we have found that the acid is formed directly in the solid and not merely after dissolution of the irradiated crystal in water. Acetylation and a change in configuration at carbon $C_2$ in the glycoside exerts little effect on the G value for glycosidic bond cleavage. It was found for example that despite the fact that deacetylation of tetra-O-acetal $\alpha$-D-glycopyranoside occurred readily (initial G 7.9) there was on change in G for glycosidic cleavage. The behavior of methyl $\alpha$-D-mannopyranoside was not greatly different, giving G(mannose) 2.0. However, the replacement of methyl by phenyl conferred greater stability on the glycosidic group, as seen from the irradiation of phenyl $\beta$-D-glucopyranoside where G for glycosidic cleavage was 0.8. We have discovered quite unexpectedly that introduction of aromatic groups such as benzoyl, benzhydryl, trityl, and cinnamoyl groups confers even greater high energy radiation stability on the glycosides, as shown by the behavior of tetra-O-benzoyl phenyl $\beta$-D-glucopyranoside where the glycosidic group was 15 times more radiation resistant than in phneyl $\beta$-D-glucopyranoside. Moreover, it is not necessary that aromatic groups form the aglycon portion to ensure protection of the glycoside, as is shown by the behavior of tetra-O-benzoyl methyl $\alpha$-D-glucopyranoside, in which particular case no reducing power or irradiation products could be detected on the fully benzoylated and water soluble debenzoylated glycoside even after a dose of $4.6 \times 10^{21}$e.v./g. Using hepta-O-acetyl phenyl $\beta$-maltoside, it was found that the intramolecular energy transfer effects extend at least the length of a disaccharide unit. More scission occurred at the disaccharide link (G 0.10) than at the glycosidic link (G. 0.05). This is appreciably less than for an unprotected disaccharide, where the cleavage of the disaccharide link by high energy radiation is at least 20 times more susceptible. The high energy radiation stabilization of glycosides by aromatic groups, particularly the unexpected high radio-protection offered by the introduction of benzoyl, benzhydryl, trityl, an cinnamoyl groups, offers a practical method for reducing the damage of high energy radiation on glycosides.

The nature of the linkage of the aromatic group to the cellulose molecule was not as important as the radiation stability of the linkage. For example, if localization of energy occurred which cleaved the aromatic group from the cellulose molecule, the radioprotection of the cellulosic molecular chain by the aromatic group was not effective. If the aromatic group was modified, so that the effective number of $\pi$-electrons was decreased, the radioprotection of the cellulosic chain was also decreased. The radioprotection of the cellulosic molecular chain by benzhydryl, trityl, benzoyl, and cinnamoyl groups was effective over distances equivalent to several cellobiose units. The radioprotection of the cellulosic chain by naphthoyl groups was significant but not as effective as the listed groups. Due to the sharing of $\pi$-electrons in the naphthoyl group, the effective number of $\pi$-electrons was reduced, and consequently the radioprotective effect of the group was also reduced. Benzyl groups were cleaved from the cellulose molecule on irradiation and offered no radioprotection to the cellulosic chain, at least at the high radiation dosages used. The ESR spectra of the irradiated celluloses, both substituted and unsubstituted, were similar. This indicated that the presence of aromatic groups did not change the nature of the long-lived free radicals induced in cellulose on irradiation. It is suggested that selective energy absorption by the aromatic group from the spur of high energy electrons produced on interaction of $\gamma$-radiation with the cellulose molecule could account for the radioprotection of the cellulosic molecular chain.

More particularly this invention relates to the protection of fibrous cotton cellulose to damage by reason of exposure to high energy radiation and as is the case with the simpler materials which contain the glycosidic bond, protection is achieved by the introduction of aromatic groups as substituents. The aromatic groups allow intramolecular transfer of high energy away from the glycosidic bond and thereby prevent or greatly decreases cleavage of the glycosidic bond.

Considerable effort has been expended recently to extend radiation sterilization processes to cotton products, particularly surgical cotton sutures, and to make new textile products by high-energy radiation-induced formation of graft polymers of vinyl type monomers with fibrous cotton cellulose. The transfer of high energy in fibrous cotton cellulose is dependent on the initial random non-localized deposition of the high energy in the cellulose molecule and the rapid localization of the energy in the cellulose molecule. This intramolecular transfer of high energy in cotton cellulose has led predominantly to the localization of high energy in the glycosidic bond, causing cleavage of the bond and radiation damage to the fibrous cotton particularly as evidenced by loss in tensile strength. Obviously this type of radiation damage seriously limits or prohibits the use of high energy radiation processes in the radiation sterilization of cotton products or in the development of radiation-induced graft polymers of fibrous cotton to give new textile products.

We have found that a change in the intramolecular transfer of high energy in fibrous cotton can be effected. This change apparently decreases the localization of energy in the glycosidic bond, decreases or prevents the cleavage of the glycosidic bond, and thereby reduces the radiation damage of the fibrous cotton. Protection against radiation damage is evidenced by the retention of the high tensile strength of the fibrous cotton following exposure to high energy radiation. For example, if fibrous cotton cellulose is benzoylated in pyridine with benzoyl chloride and then exposed to high-energy gamma radiation from cobalt-60, the retention of the initial tensile strength of the irradiated, benzoylated fibrous cotton is many times greater than that of irradiated, untreated fibrous cotton. After irradiation of the benzoylated fibrous cotton, the benzoyl groups can be chemically removed, and fibrous cotton which retains several times the tensile strength of the irradiated, untreated fibrous cotton can be recovered. The discovery, that intramolecular transfer of high-energy in a high molecular weight carbohydrate, such as fibrous cotton, can be effected to transfer energy away from the glycosidic bond where most of the radiation damage to fibrous cotton usually occurs, is surprising and wholly unexpected. The significance of this discovery to the development and application of high-energy radiation processes in the fibrous cotton textile industry is obvious. Heretofore, it was commonly believed that high-energy radiation had no place in fibrous cotton textile processes due to the radiation damage observed as losses in tensile strength of the cotton textile products.

The following examples set forth the invention in more detail.

EXAMPLE 1

Methyl $\alpha$-D-glucopyranoside was irradiated in the solid state in glass vessels by high energy gamma radiation from cobalt-60 at a dose rate of $1.58 \times 10^{19}$ e.v./ml./hr. at about 25° C. Analyses of the products of irradiation damage showed that the concentration of glucose varied linearly with dosage to $2 \times 10^{21}$ e.v./g., giving initial G(glucose) 2.33 and initial G(acid) 1.45. The results are tabulated in Table I.

EXAMPLE 2

Tetra-O-acetyl methyl $\alpha$-D-glucopyranoside was irradiated in the solid state in glass vessels by high energy gamma radiation from cobalt-60 at a dose rate of $1.58 \times 10^{19}$ e.v./ml./hr. at about 25° C. Analyses of the products of irradiation damage showed that the formation of glucose on irradiation of tetra-O-acetyl methyl $\alpha$-D-glucopyranoside, was almost identical with glucose from the unacetylated glucopyranoside, giving initial G(glucose) 2.33. Radiation-induced deacetylation gave initial G(acetic acid) 7.9. The results are tabulated in Table I.

EXAMPLE 3

Methyl $\alpha$-D-mannopyranoside was irradiated in glass vessels by high energy radiation from cobalt-60 at a dose rate of $1.58 \times 10^{19}$ e.v./ml./hr. at about 25° C. as compared with methyl $\alpha$-D-glucopyranoside. Analyses of the products of irradiation damage showed that the concentration of mannose varied linearly with dosage to $375 \times 10^{21}$ e.v./g., giving initial G(mannose) 2.0. The results are tabulated in Table I.

EXAMPLE 4

Phenyl $\beta$-D-glucopyranoside was irradiated in the solid state in glass vessels by high energy gamma radiation from cobalt-60 at a dose rate of $1.58 \times 10^{19}$ e.v./ml./hr. at about 25° C. Analyses of the products of irradiation damage showed that the concentration of glucose on irradiation of phenyl $\beta$-D-glucopyranoside varied linearly with dosage to $3.75 \times 10^{21}$ e.v./g., giving initial G(glucose) 0.8. Glucose was the only product detected by paper chromatography to a dosage of $4.61 \times 10^{21}$ e.v./g. The initial G(phenol) was also 0.8. At a dosage of $5.44 \times 10^{21}$ ev./g. G(acid) was 0.5. The results are tabulated in Table I.

EXAMPLE 5

Tetra-O-benzoyl phenyl $\beta$-D-glucopyranoside was irradiated in the solid state in glass vessels by high energy gamma radiation from cobalt-60 at a dose rate of $1.58 \times 10^{19}$ e.v./ml./hr. at about 25° C. Analyses of the products of irradiation damage showed that the glycosidic group in the compound was resistant to radiation cleavage. Even at dosages as high as $6.16 \times 10^{21}$ e.v./g., the reducing power was too low to be accurately measured. Due to the sensitivity of the method for phenol determination, an initial G(phenol) 0.05 was measured. The results are tabulated in Table I.

EXAMPLE 6

Tetra-O-benzoyl methyl $\alpha$-D-glucopyranoside was irradiated in the solid state in glass vessels by high energy gamma radiation from cobalt-60 at a dose rate of $1.58 \times 10^{19}$ e.v./ml./hr., at about 25° C. Analyses of the products of irradiation damage showed that at dosages as high as $4.55 \times 10^{21}$ e.v./g. No reducing power was measurable on the benzoylated or debenzoylated irradiated glycosides. The results are tabulated in Table I.

Various aromatic substituted glucosides were prepared and their properties determined. Particularly, the effects of high energy radiation on the following glucosides were determined.

Methyl 2,3,4,6-tetracarbamoyl-$\alpha$-D-glucopyranoside
Methyl 2,3,4,6-tetra-O-tosyl-$\beta$-D-glucopyranoside
Methyl 2,3,4,6-tetra-O-tosyl-4-chloro-$\beta$-D-glucopyranoside
Methyl 2,3,4,6-tetra-O-(p-methoxy)-benzoyl-$\alpha$-D-glucopyranoside
Methyl 2,3,4,6-tetra-O-(p-nitro)-benzoyl-$\alpha$-D-glucopyranoside
Methyl 2,3,4,6-tetra-O-(p-carbethoxy)-benzoyl-$\alpha$-D-glucopyranoside
Methyl 2,3,4,6-tetra-O-(o-chloro)-benzoyl-$\alpha$-D-gucopyranoside and
Methyl 2,3,4,6-tetra-O-nicotinyl-$\alpha$-D-glucopyranoside.

Each compound was irradiated in air and in the solid state and at ambient temperature with a cobalt-60 radiation source. The dose rate, determined by ferrous-ferric dosimetry, was $7.3 \times 10^{19}$ e.v./g./hr. The irradiated samples were analyzed immediately after irradiation. Very high radiation stability, except in the case of compounds 2 and 3, was observed. In the case of all the other compounds, the radiation stability was so high that no reducing power was measurable even after dosages as high as $5.2 \times 10^{21}$ e.v./g.

EXAMPLE 7

Hepta-O-acetyl phenyl β-maltoside was irradiated in the solid state in glass vessels by high energy gamma radiation from cobalt-60 at a dose rate of $1.58 \times 10^{19}$ e.v./ml./hr. at about 25° C. Analyses of the products of irradiation damage showed that initial G(phenol) was 0.05; initial G(disaccharide bond cleavage) was 0.10. The results are tabulated in Table I.

TABLE I.—HIGH ENERGY RADIATION STABILIZATION OF GLYCOSIDES BY AROMATIC GROUPS

| Glycoside | Product | Initial G value [1] |
|---|---|---|
| Methyl α-D-glucopyranoside | Glucose | 2.33 |
|  | Acid | 1.45 |
| Tetra-O-acetyl methyl α-D-glucopyranoside | Glucose | 2.33 |
|  | Acetic acid | 7.9 |
| Methyl α-D-mannopyranoside | Mannose | 2.0 |
| Phenyl β-D-glucopyranoside | Glucose | 0.8 |
|  | Phenol | 0.8 |
|  | Acid | 0.5 |
| Tetra-O-benzoyl phenyl β-D-glucopyranoside | Glucose | [2] |
|  | Phenol | 0.05 |
| Tetra-O-benzoyl methyl α-D-glucopyranoside | Glucose | [2] |
| Hepta-O-acetyl phenyl β-maltoside | Phenol | 0.05 |
|  | Disaccharide cleavage | [3] 0.10 |

[1] The lower the initial G value, the higher the stability to radiation.
[2] Not detectable.
[3] Without phenyl, typical G value was 2.1.

EXAMPLE 8

Purified fibrous cotton (13 parts) in the form of 7s/3 yarn (a convenient form for handling and testing) was reacted relaxed with benzoyl chloride 31 parts) in pyridine solution (150 parts) at 90° C. for 10 minutes; the reacted cotton was stretched to about 80 percent of its original length; washed with pyridine; followed by washing with methanol; then finally washed with water; and oven-dried in air at 100° C. to constant weight. The analyzed degree of substitution was 1.3 benzoyl groups per anhydroglucose unit of the cotton cellulose. The initial strength of the benzoylated yarn was 12.8 pounds; after exposure to gamma radiation from cobalt-60 (a convenient source of high energy radiation) in air to a dosage of $1.32 \times 10^{21}$ e.v./g., the strength of the irradiated, benzoylated cotton yarn was 10.3 pounds. Untreated cotton yarn had a strength of 10.8 pounds; after irradiation to the same dosage the strength of irradiated, untreated yarn was 2.7 pounds. Protection from radiation damage is indicated by the facts (1) that the benzoylated cotton yarn (degree of substitution 1.3) retained 80 percent of its original strength on irradiation and (2) that untreated cotton yarn retained only 25 percent of its original strength on irradiation.

EXAMPLE 9

Purified fibrous cotton (13 parts) in the form of 7s/3 yarn was reacted relaxed with benzoyl chloride (31 parts) in pyridine solution (150 parts) at 75° C. for 20 minutes. The reacted cotton (under relaxed conditions) was washed with pyridine; followed by washing with methanol; then finally washed with water; and oven-dried in air at 100° C. to constant weight. The analyzed degree of substitution was 1.3 benzoyl groups per anhydroglucose unit of the cotton cellulose. The initial strength of the benzoylated yarn was 5.2 pounds; after exposure to gamma radiation from cobalt-60 in air to a dosage of $1.32 \times 10^{21}$ e.v./g., the strength of the irradiated, benzoylated cotton yarn was 4.2 pounds, retaining 81 percent of the strength of the treated, unirradiated yarn. Untreated cotton yarn had a strength of 10.8 pounds; after irradiation to the same dosage the strength of irradiated, untreated yarn was 2.1 pounds, retaining 19 percent of the untreated, unirradiated yarn.

EXAMPLE 10

Purified fibrous cotton (13 parts) in the form of 7s/3 yarn was reacted relaxed with benzoyl chloride (31 parts) in pyridine solution (150 parts) at 75° C. for 20 minutes. The reacted cotton (under relaxed conditions) was washed with pyridine; followed by washing with methanol; then finally washed with water; and oven-dried in air at 110° C. to constant weight. The analyzed degree of substitution was 1.3 benzoyl groups per anhydroglucose unit of the cotton cellulose. The benzoylated cotton was further dried overnight in vacuum over $P_2O_5$ at 25° C. to decrease the moisture content to about 0.5 percent. The benzoylated cotton was irradiated in nitrogen by gamma radiation from cobalt-60 to a dosage of $5.2 \times 10^{19}$ e.v./g. After irradiation the benzoylated cotton was treated with an aqueous zinc chloride solution (75 percent) containing acrylonitrile (15 percent) for 2 hours at 25° C. Then this treated benzoylated cotton was washed with N,N-dimethformamide to remove acrylonitrile and any homopolymer formed, followed by washing with water, and air-dried. No weight gain on the irradiated, benzoylated cotton yarn was noted. Irradiated, purified cotton yarn reacted similarly had weight gains of polyacrylonitrile as high as 40 percent. This indicated that benzoylation of the cotton aided in the rapid localization and dissipation of the radiation-activated sites which are capable of initiating polymerization of acrylonitrile and which are capable of causing radiation damage.

EXAMPLE 11

Fibrous cotton in the form of yarn was benzoylated and subsequently irradiated according to the methods set forth in Example 8 above. Following irradiation of the benzoylated yarn the protective groups were removed by saponification in order to recover an irradiated fibrous cotton not chemically modified. The fibrous cotton yarn before benzoylation exhibited a breaking strength of 9.95 pounds. After benzoylation the breaking strength of the yarn was 12.60 pounds. The benzoylated yarn after irradiation (cobalt-60) showed a breaking strength of 7.89 pounds and the benzoylated yarn after irradiation and after debenzoylation showed a breaking strength of 3.24 pounds. A similar cotton yarn irradiated without benefit of the protective benzoyl groups showed a breaking strength of only 2.80 pounds. Accordingly, it is possible by virtue of the irradiation protective influence of aromatic groups (benzoyl groups) to obtain an irradiated fibrous cotton which is chemically unmodified with a breaking strength greater than $$\left(\frac{3.24}{2.80} \times 100 = 115.7\%\right)$$

the same fibrous cotton subjected to irradiation without benefit of the protective aromatic groups which latter can easily be removed by saponification subsequent to the irradiation step.

We claim:
1. A method for preventing fiber degradation in cotton during irradiation which method comprises the steps:
  (a) esterifying the cotton through reaction with benzoyl chloride,
  (b) irradiating the cotton product of step (a), and

(c) removing the aromatic substituents from the irradiated cotton product of step (b) by saponification.

References Cited

FOREIGN PATENTS 645,539   7/1962   Canada.

OTHER REFERENCES

Atomic Radiation and Polymers, A. Charlesby, 1960, pp. 10–13.

Cellulose and Cellulose Derivatives, Ott et al., Part II, 1954, pp. 815–816.

GEORGE F. LESMES, Primary Examiner

J. CANNON, Assistant Examiner

U.S. Cl. X.R.

204—159.12, 160.1; 117—93.3; 260—210, 224